United States Patent
Connett et al.

(10) Patent No.: US 6,719,077 B2
(45) Date of Patent: Apr. 13, 2004

(54) HOOD LATCHING SYSTEM

(75) Inventors: Jerry J. Connett, Fort Wayne, IN (US); Lawrence Hoffman, Hoagland, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 148 days.

(21) Appl. No.: 10/081,670

(22) Filed: Feb. 22, 2002

(65) Prior Publication Data

US 2003/0159867 A1 Aug. 28, 2003

(51) Int. Cl.⁷ .............................................. B62D 25/10
(52) U.S. Cl. ............................... 180/69.21; 292/DIG. 1
(58) Field of Search ........................... 180/69.2, 69.21, 180/69.24; 292/100, 113, 247, DIG. 1; 296/190.06, 198

(56) References Cited

U.S. PATENT DOCUMENTS

| | | | | |
|---|---|---|---|---|
| 2,784,994 A | * | 3/1957 | Hopkins | 292/247 |
| 3,338,326 A | * | 8/1967 | Hafer et al. | 180/69.21 |
| 3,419,099 A | * | 12/1968 | Brumbaugh et al. | 180/69.24 |
| 3,754,613 A | * | 8/1973 | Stephens et al. | 180/69.21 |
| 3,985,380 A | * | 10/1976 | Raivio | 292/69 |
| 4,243,255 A | * | 1/1981 | Hornak | 292/113 |
| 4,801,165 A | * | 1/1989 | Pyle | 292/249 |
| 4,804,215 A |   | 2/1989 | Bisbing |  |
| 4,830,413 A |   | 5/1989 | Bisbing |  |
| 5,480,197 A | * | 1/1996 | Ernst et al. | 292/113 |
| 5,607,195 A | * | 3/1997 | Antonucci | 292/247 |

FOREIGN PATENT DOCUMENTS

| | | | | |
|---|---|---|---|---|
| CA | 646320 | * | 8/1962 | 180/69.21 |
| DE | 1001908 | * | 1/1957 | 180/69.2 |
| SU | 2013271 | * | 5/1994 | 180/69.21 |

* cited by examiner

*Primary Examiner*—Frank Vanaman
(74) *Attorney, Agent, or Firm*—Jeffrey P. Calfa; Susan L. Lukasik; Dennis Kelly Sullivan (57) ABSTRACT

A hood-latching system for a vehicle that has an engine-compartment hood that can be moved between a closed position and one or more open positions. The hood-latching system comprises one or more novel hood latches that are operable, when secured in a latched state to apply hood retention forces to the engine-compartment hood and thus, to secure the engine-compartment hood in its closed position. The novel hood latches of the hood latching system comprise prop legs that support the novel hood latches out of a path of travel of the engine-compartment hood when the novel hood latches are not secured in a latched state. The prop legs of the novel hood latches, thus, enable one person to close the engine-compartment hood of the vehicle without pinching the novel hood latches between the engine-compartment hood and latch-anchor components to which the novel hood latches are mounted.

20 Claims, 10 Drawing Sheets

HOOD LATCHING SYSTEM

BACKGROUND OF THE INVENTION

The present invention relates to hood-latching systems for releasably holding engine-compartment hoods in a closed position. Such hood-latching systems includes one or more hood latches, each of which has latch-mounting structure through which the hood latch is mounted to either the engine-compartment hood or a latch-anchor component of the vehicle. Each hood latch of such hood-latching systems has latching structure which can be releasably latched to base latching-structure anchored to whichever of the engine-compartment hood and the latch-anchor component the hood latch is not mounted. When the latching structure of the hood latches and the base latching-structures of the hood-latching system are disengaged from one another the hood-latching system presents no resistance to movement of the engine-compartment hood from its closed position. When the latching structures of the hood latches and the base latching-structures of such a hood-latching system are latched to one another and the hood latches are secured, the hood latches resist movement of the engine-compartment hood from its closed position.

In particular the present invention relates to hood-latching systems that have hood latches with a tension body constructed of elastomer material. The tension body of such hood latches is stretched from its free state and applies hood-retention forces to the engine-compartment hood of the vehicle when the hood latches are properly latched and secured. The tension bodies of such hood latches have an anchor end and a draft end. The anchor end of the tension body of such a hood latch has either the latching structure of the hood latch or the latch-mounting structure of the hood latch attached to it and the draft end of the tension body has attached to it whichever of the latching structure and the latch-mounting structure the anchor end does not have attached to it. The draft end of such a hood latch has a draft lever attached to it. A portion of the draft lever distant from a pivot end of the draft lever is attached to the draft end of the tension body. The tension body and the draft lever are constructed and engaged to one another in such a manner that the draft lever can pivot about axes perpendicular to the longitudinal axis of the tension body relative to portions of the tension body distant from the draft lever. When such a hood latch is properly latched, whichever of the anchor end and the draft end of the tension body has the latching structure of the hood latch engaged to it is prevented, by the base latching-structure, from moving substantially in a direction toward the opposite end of the tension body. Also, when such a hood latch is properly latched, the pivot end of the draft lever is pivotally engaged to whichever of the engine-compartment hood and the latch-anchor component the anchor end of the tension body is not engaged to. When the hood latch is properly latched a draft line of the tension body can be considered to be a line extending through the point at which the anchor end of the tension body is engaged to either the engine-compartment hood or the latch-anchor component and also through the point at which the draft lever is engaged to the draft end of the tension body. In order to secure such a hood latch that is properly latched, force is applied to the draft end of the tension body and the draft lever in such a manner that the tension body is stretched as its draft end is extended away from its anchor end and the draft lever rotates in such a direction that the draft line initially moves toward the pivot end of the draft lever. Rotation of the draft lever in such a direction is continued until the draft line has passed the pivot end of the draft lever and the draft line is disposed closer to the engine-compartment hood and the latch-anchor component than is the pivot end of the draft lever. Once the draft line of the tension body is disposed closer to the engine-compartment hood and the latch-anchor component than the pivot end of the draft lever in such a manner, tension forces in the tension body tend to cause rotation of the draft lever toward whichever of the engine-compartment hood and the latch-anchor structure the draft lever is pivotally engaged to. The forces that tend to cause rotation of the draft lever in such a direction are balanced by abutment between the draft lever and/or the tension body and the engine-compartment hood and/or the latch anchor component. Thus, when the hood latch is latched and drawn to such a position that the draft line of the tension body is closer to the engine-compartment hood and the latch-anchor structure than the pivot end of the draft lever, the hood latch is secured in stable equilibrium and applies hood-retention forces to the engine-compartment hood. A construction and arrangement of a hood latch, an engine-compartment hood, and a latch-anchor component that enables securement of the hood latch in stable equilibrium in such a manner is often referred to as an over-center design.

Figure 6:
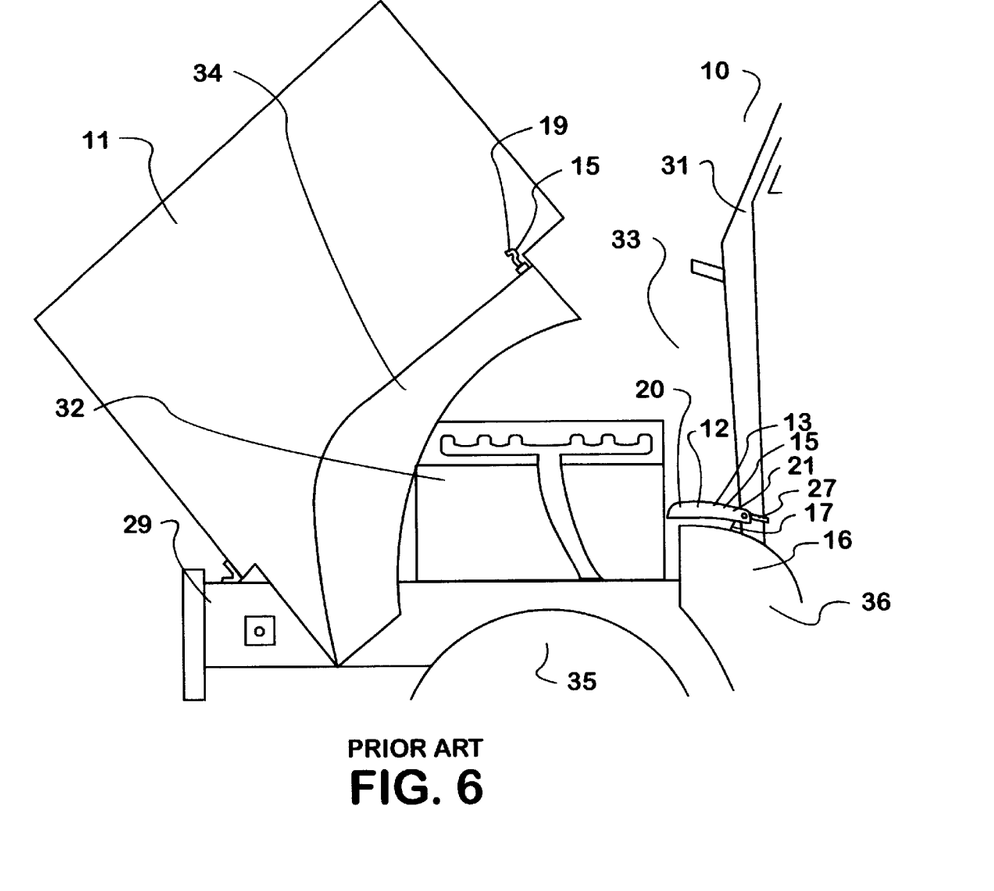
FIG. 6 is side view showing a front portion of a prior art vehicle with the engine compartment hood open.
Figure 7:
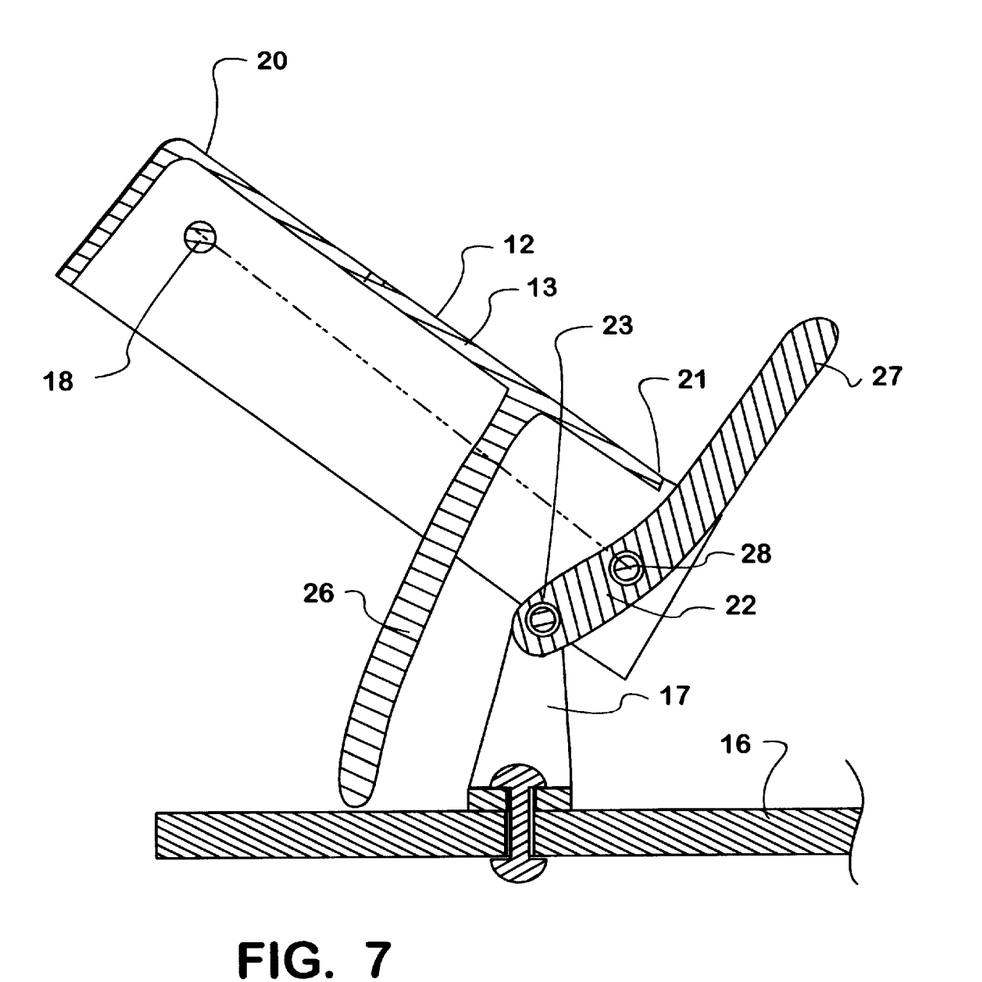
FIG. 7 is a sectional view of a hood latch according to the present invention mounted to a latch-anchor component and not latched to base latching-structure and the prop leg of the hood latch supporting the tension body thereof above the latch-anchor component.

The present invention relates more specifically to a hood-latching system that has hood latches as described above and wherein the engine-compartment hood is pivotally mounted to the vehicle at a point distant from points at which one or more hood latches that are mounted to latch-anchor component(s) may be latched to the engine-compartment hood. When the hood latch(s) of such a hood latching system are not latched and the engine-compartment hood is pivoted to an open position, the hood latch(s) may subsequently fall into a position such that, when the engine-compartment hood is subsequently pivoted toward its closed position the hood latch(s) can become pinched between the engine-compartment hood and the latch-anchor component(s) to which the hood latch(s) are mounted. FIG. 6, illustrates a prior art vehicle with a such a hood-latching system wherein the engine-compartment hood has been opened and the hood latches of the hood-latching system have fallen into the path of the engine-compartment hood such that, if the engine-compartment hood were closed without moving the hood latches, the hood latches would be pinched between the engine-compartment hood and the latch-anchor components to which they are mounted. Such a construction and arrangement of a hood-latching system may make it necessary to employ the services of two or more people to close the engine-compartment hood because it may be necessary to manually hold the hood latches out of the path of travel of the engine-compartment hood while it is pivoted toward its closed position.

SUMMARY OF INVENTION

As a result, an object of the present invention is to provide a hood-latching system with hood latches of an over-center design that are mounted to latch-anchor components and that allow for closing of the engine-compartment hood of the vehicle and latching and securement of the hood latches by a single individual.

The present invention is a hood latch, a hood-latching system that comprises one or more of the hood latches of the present invention, and a vehicle that comprises such a hood-latching system with the hood latches of the present invention. The hood latch of the present invention has a tension body that is constructed of elastomer material and has a prop leg that extends from the tension body at an angle to the longitudinal axis of the tension body. A vehicle according to the present invention comprises one or more of the hood latches of the present invention mounted to latch-anchor components that a periphery of the engine-compartment hood of the vehicle is adjacent when the engine-compartment hood is closed. The hood latches of the present invention are of such a construction and the construction of and arrangement of the hood-latching system according to the present invention is such that the hood latches have an over-center design. According to the present invention one or more of the hood latch(s) are mounted to latch anchor component(s) in position(s) and orientation(s) such that their prop leg(s) extending from the tension body(s) prop the tension body(s) above the latch-anchor component(s) to which the hood latch(s) are mounted when the hood latch(s) are not latched. Thus, when the hood latch(s) of the hood-latching system of the present invention are not latched and the engine-compartment hood is pivoted to its open position the prop leg(s) of the hood latch(s) support the tension body(s) of the hood latch(s) above the latch-anchor component(s) to which they are mounted so that the tension body(s) will not be pinched between the engine-compartment hood and the latch-anchor component(s) when the engine-compartment hood is closed.

Thus, it can be seen that the above-mentioned objects of the invention as well as others not mentioned have been met.

DRAWINGS

Other objects and advantages of the invention will become more apparent upon perusal of the detailed description thereof and upon inspection of the drawings in which.

DETAILS OF INVENTION

The present invention is a hood latch 12 for a hood-latching system 15 of a vehicle 10. A vehicle 10 according to the present invention comprises an engine-compartment hood 11 that can be securely retained by the hood-latching system 15 in a closed position in which it substantially covers the engine compartment 32 of the vehicle 10. The engine-compartment hood 11 of a vehicle 10 according to the present invention may also be moved to one or more open positions in which the engine compartment 32 of the vehicle 10 is exposed, when the hood latches 12 of the hood-latching system 15 are not latched. The construction of the engine-compartment hood 11 of a vehicle 10 according to the present invention may be any of a number of designs well known to and/or easily imaginable by one of ordinary skill in the art. In the preferred embodiment the engine-compartment hood 11 has a front portion thereof pivotally engaged to the vehicle 10 at a point in front of the engine compartment 32 so that the engine-compartment hood 11 may be pivoted upwardly and forwardly to its open position and subsequently pivoted rearwardly and downwardly to a closed position.

The hood-latching system 15 according to the present invention comprises one or more hood latches 12 that have tension bodies 13 constructed of elastomer material. One or more of the hood 12 of the hood-latching system 15 are hood latches that have tension bodies 13 constructed of elastomer material with a prop leg 26 extending from the tension body 13 thereof. Each of the hood latches 12 of the hood-latching system 15 according to the present invention is mounted to a latch-anchor component 16 of the vehicle 10 at a point, adjacent which, a portion of a periphery of the engine-compartment hood 11 is disposed when the engine-compartment hood 11 is closed. The tension body 13 of each of the hood latches 12 of the hood-latching system 15 according to the present invention has an anchor end 20 and a draft end 21. Each of the hood latches 12 of the hood-latching system 15 according to the present invention may have either the anchor end 20 or the draft end 21 of its tension body 13 mounted to the respective latch-anchor component 16 that the hood latch 12 is mounted to through latch-mounting structure 17. As can be seen in FIGS. 1, 2, 3, 4, 5, 7, and 10, in the preferred embodiment, the draft end 21 of the tension body 13 of each hood latch 12 is mounted to the latch-anchor component 16. According to the present invention each hood latch 12 has latching structure 18 engaged to whichever of the anchor end 20 and the draft end 21 of its tension body 13 that is not mounted to the latch-anchor component 16. Base latching-structure 19 is engaged to the engine-compartment hood 11 of the vehicle 10 and the latching structure 18 of each of the hood latches 12 can be releasably latched to the base latching-structure 19. When the latching structure 18 of each hood latch 12 is latched to base latching-structure 19 engaged to the engine-compartment hood 11, the end of the tension body 13 that is engaged to the latching structure 18 of the hood latch 12 Is prevented from moving in directions toward the opposite end of the tension body 13. This can best be seen in FIG. 4 which illustrates one embodiment of a hood latch 12 according to the present invention with the latching structure 18 thereof latched to base latching-structure 19 of the hood latching system 15. Each of the hood latches 12 of the hood-latching system 15 comprises a draft lever 22 which has a pivot end 23 that is pivotally engaged to whichever of the engine-compartment hood 11 and the latch-anchor structure 16 the anchor end 20 of the tension body 13 is not engaged, when the hood latch 12 is properly latched. The draft end 21 of the tension body 13 of each of the hood latches 12 is engaged to the draft lever 22 thereof at a point distant from the pivot end 23 of the draft lever.

Figure 5:
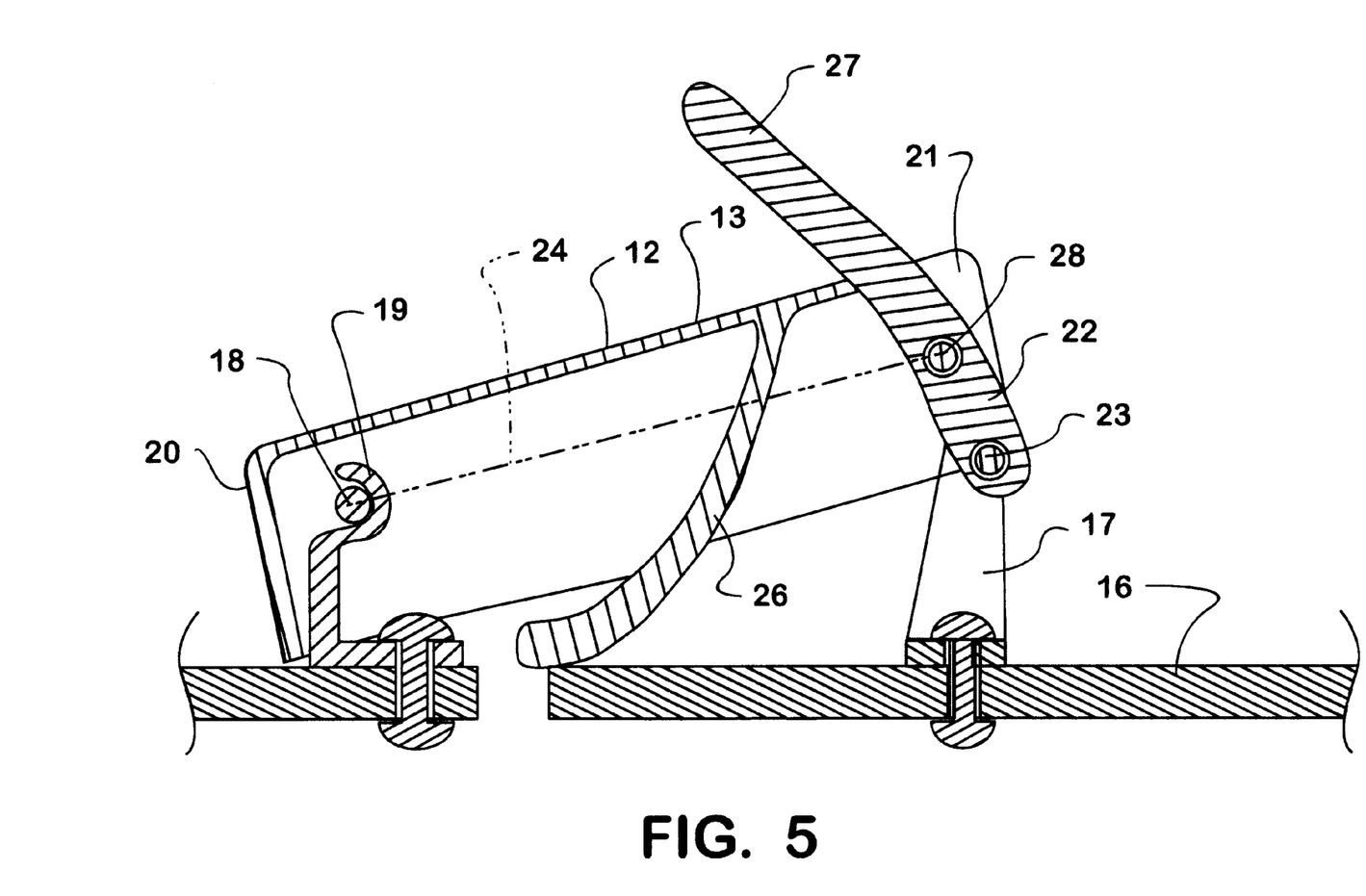
FIG. 5 is a sectional view of a hood latch according to the present invention mounted to a latch-anchor component and latched but not secured.

Each of the hood latches 12 of the hood-latching system 15 is constructed and engaged to the other components of the vehicle 10 in such a manner that they may be considered to be of an over-center design. The tension body 13 of each of the hood latches 12 is long enough that, when its draft lever 22 is rotated to the position in which its pivot end 23 is a far as possible from the anchor end 20 of the tension body 13, the latching structure 18 of the hood latch 12 may be releasably latched to base latching-structure 19 of the hood-latching system 15 without stretching the tension body 13. A hood latch 12 in such a latched but unsecured position is shown in FIG. 5. Once a hood latch 12 is latched in such a manner, it is secured by simultaneously rotating the draft lever 22 about its pivot end 23 away from the anchor end 20 of the tension body 13 and stretching the draft end 21 of the tension body 13 away from the anchor end 20 of the tension body 13. The draft lever 22 is rotated in this direction until the draft line 24 of the tension body 13 passes the point about which the draft lever 22 rotates at its pivot end 23 and subsequently moves to a position where the draft line 24 of the tension body 13 is closer to the engine-compartment hood 11 and the latch-anchor component 16 than the point about which the pivot end 23 of the draft lever 22 is pivotal. Once the draft line 24 of the tension body 13 is disposed closer to the engine-compartment hood 11 and the latch-anchor structure 16 than the point about which the pivot end 23 of the draft lever is pivotal, the hood latch 12 is secured in stable equilibrium in its latched state, In order to unlatch one of the hood latches 12 the draft lever 22 is pivoted about its pivot end 23 in the direction opposite that in which it is pivoted to secure the hood latch 12 in its latched state.

Figure 1:
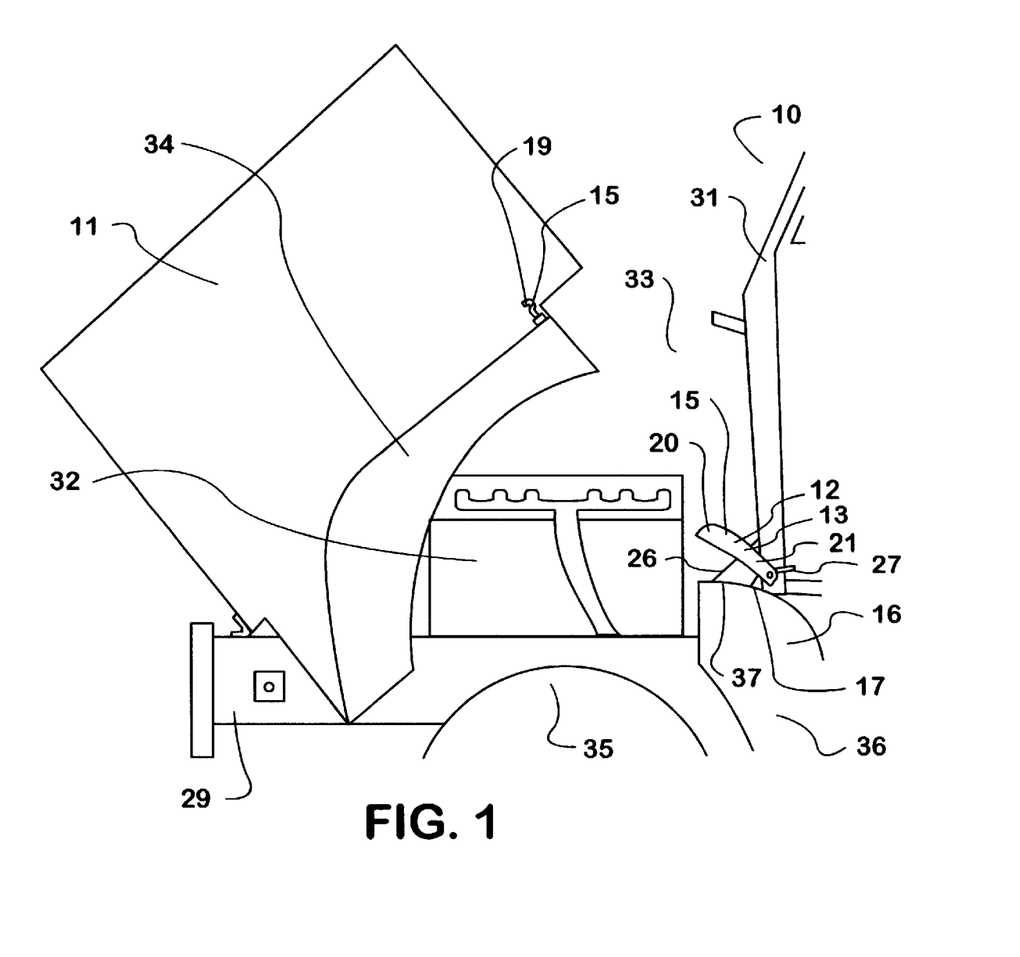
FIG. 1 is a side view showing a front portion of a vehicle with a hood latch according to the present invention with the engine compartment hood of the vehicle in an open position.
Figure 2:
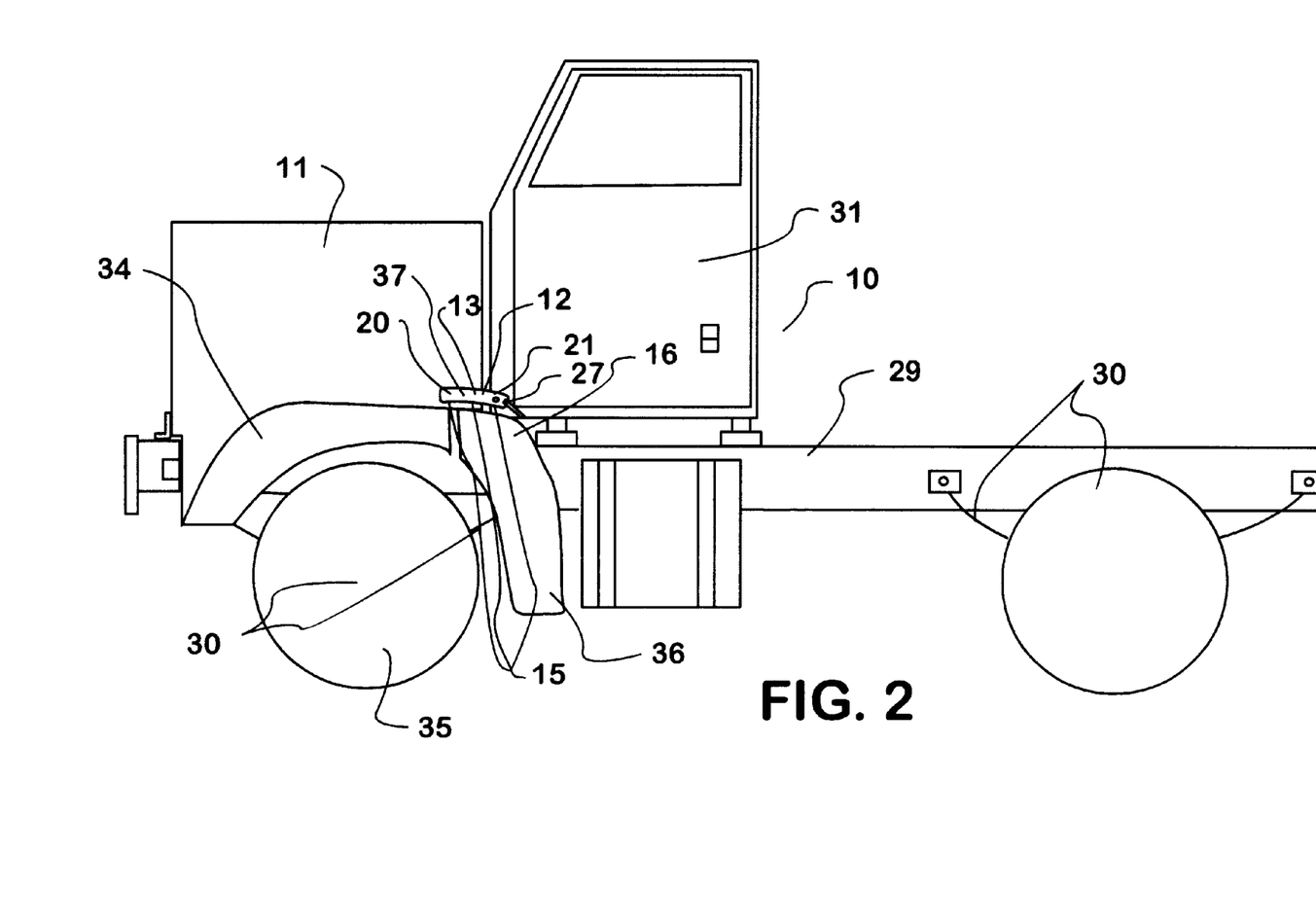
FIG. 2 is a side view of a vehicle according to the present invention with the engine compartment hood in a closed position and the visible hood latch according to the present invention secured In a latched state.
Figure 3:
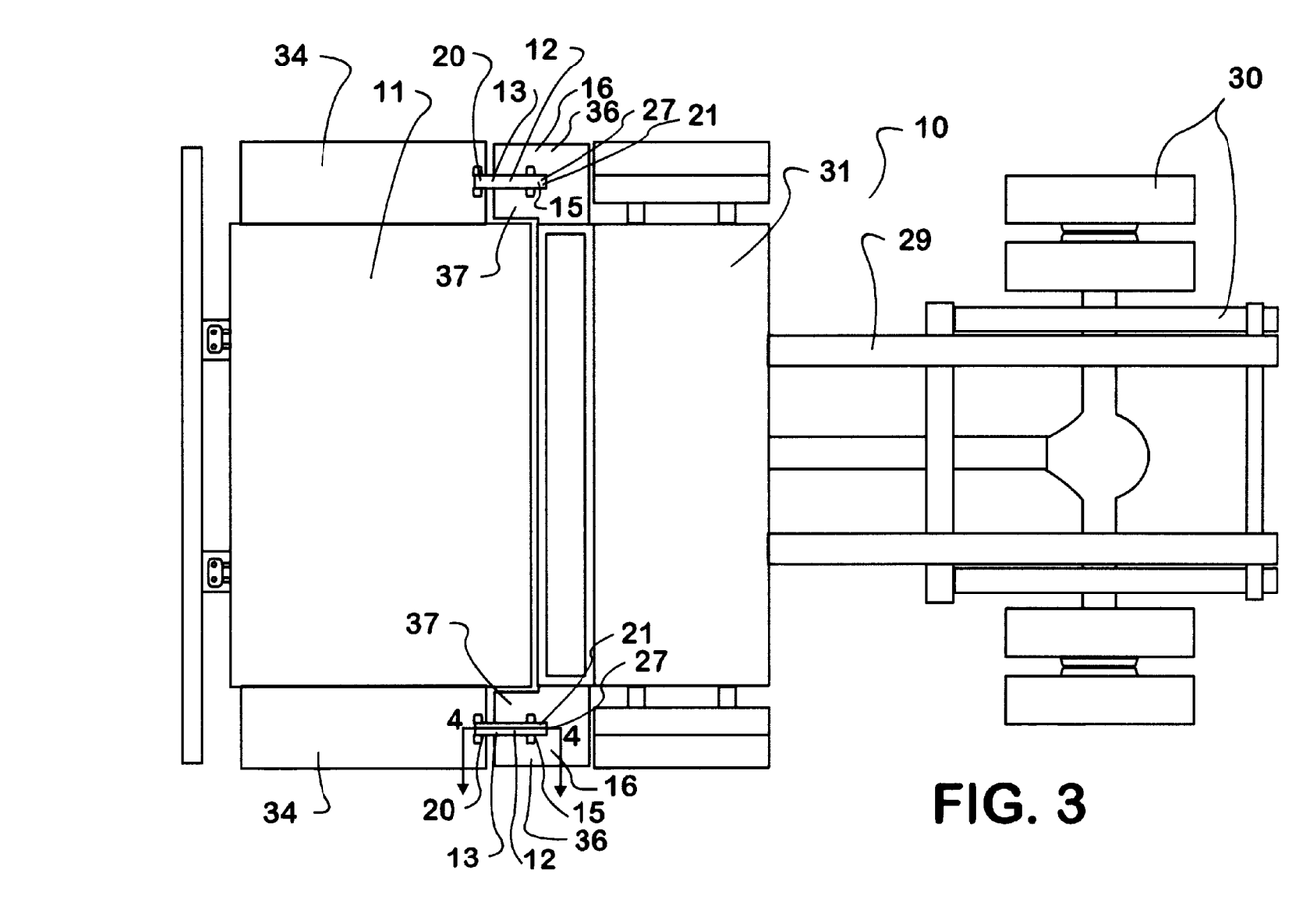
FIG. 3 is a top view of a vehicle according to the present invention with the engine compartment hood in a closed position and the visible hood latch according to the present invention secured in a latched state.
Figure 4:
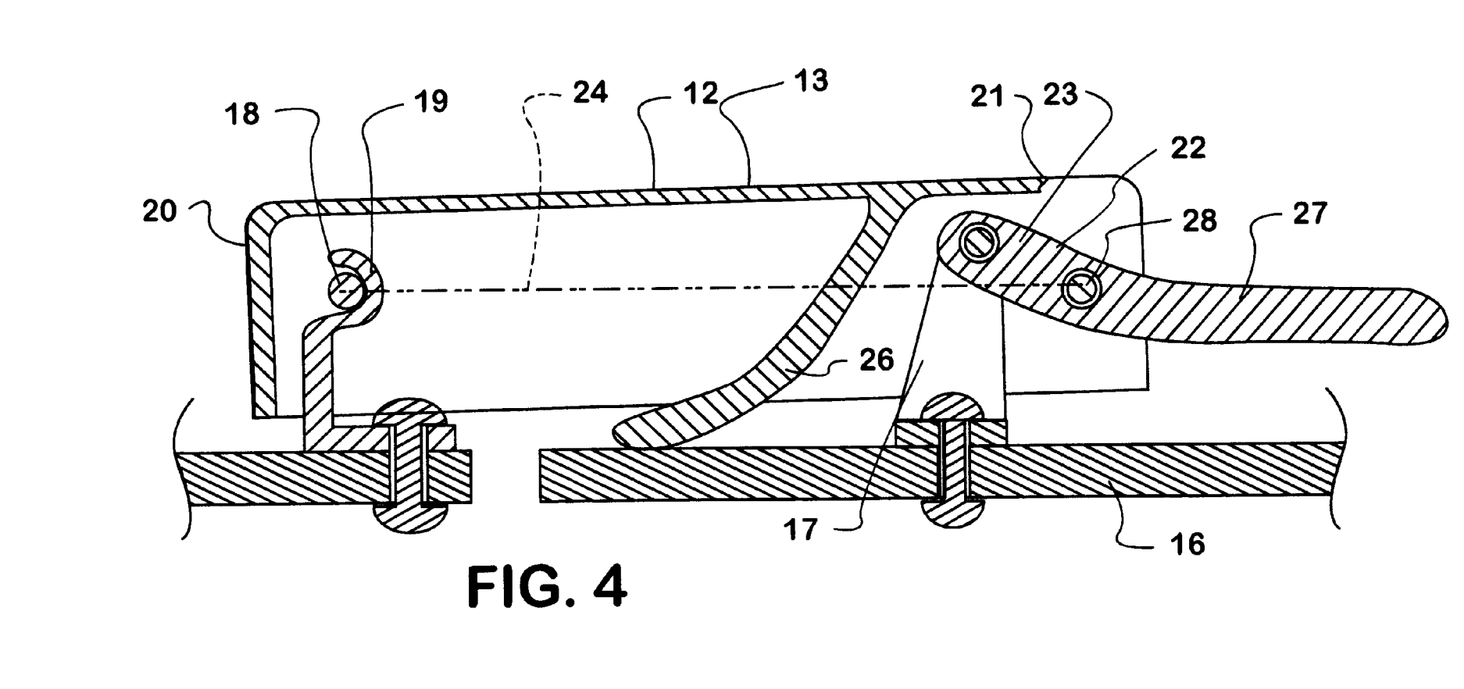
FIG. 4 is a sectional view through line 4—4 of FIG. 3 showing the details of construction of a hood latch according to the present invention mounted to a latch-anchor component and secured in a latched state.

As mentioned above, each of the hood latches 12 according to the present invention has a prop leg 26 that extends from the tension body 13 of the hood latch 12, The prop leg 26 of each of the hood latches 12 extends from a portion of the tension body 13 between its anchor end 20 and its draft end 21 and at an angle to a longitudinal axis of the tension body 13. Also, in the preferred embodiment of the invention, the latch-mounting structure 17 of each of the hood latches 12 is mounted to a latch-anchor component 16 in such a position that, when the hood latch 12 is secured in a latched state, at least part of the tension body 13 of the hood latch 12 is disposed above a non-vertical surface 37 of the latch-anchor component 16. The position and orientation of each of the hood latches 12 relative to the latch-anchor component 16 to which they are mounted and the position and orientation of the prop leg 26 of each of the hood latches 12 is such that, when the hood latch 12 is secured in a latched state, the prop leg 26 extends toward and presses against the non-vertical surface 37 of the latch-anchor component 16 that at least part of the tension body 13 is disposed above. Additionally, when each of the hood latches 12 is not latched, but is allowed to rest in the same general orientation as it is in when it is latched, the prop leg 26 extends toward and presses against the non-vertical surface 37 of the latch-anchor component 16. It will, of course, be understood that there are circumstances when a hood latch 12 not secured in a latched state will be allowed to rest in an orientation other than one similar to that which it is in when it is secured in a latched state and that in such circumstances the prop leg 26 of the hood latch 12 will not extend into contact with the non-vertical surface 37 of the latch-anchor component 16. For example, a hood latch 12 that is not secured in a latched state may be allowed to rest in a position in which the tension body 13 thereof is rotated to a side of its latch-mounting structure 17 opposite the side upon which it is disposed when the hood latch 12 is secured in a latched state. In such a situation the prop leg 26 would not extend into contact with the non-vertical surface 37 of the latch-anchor component 16 to which the hood latch 12 is mounted and would not perform its function of supporting the tension body 13 of the hood latch 12 in an elevated position above the non-vertical surface 37 of the latch-anchor component 16. Fortunately, in such a situation, it is not necessary for the prop leg 26 to perform its function anyway, as the hood latch 12, as a result of the position it is allowed to rest in, is out of the path through which the engine-compartment hood 11 travels as it is closed. The stiffness of the prop leg 26 of each of the hood latches 12 is great enough that, when the hood latch 12 is not latched, but is allowed to rest in a position and orientation such that the prop leg 26 extends into contact with and presses against the non-vertical surface 37 of the latch-anchor component 16 to which it is mounted, the prop leg 26 will support the tension body 13 of the hood latch 12 in an elevated position above the non-vertical surface 37 of the latch-anchor component 16 to which the hood latch 12 is mounted. FIG. 1 illustrates a vehicle 10 according to the present invention wherein the tension body 13 of a hood latch 12 according to the present invention is supported by a prop leg 26 thereof in an elevated position above the latch-anchor component 16 to which the hood latch 12 is mounted, so that the hood latch 12 is out of the path of travel that the engine-compartment hood 11 would go through when being closed. Additionally, in the preferred embodiment, the stiffness of the prop leg 26 of each of the hood latches 12 of the present invention is low enough that when an individual urges the tension bogy 13 toward the latch-anchor component 16 with a moderate force, such as ten pounds, the prop leg 26 of the hood latch 12 bends toward the tension body 13 so that the individual may latch and secure the hood latch 12.

Figure 8:
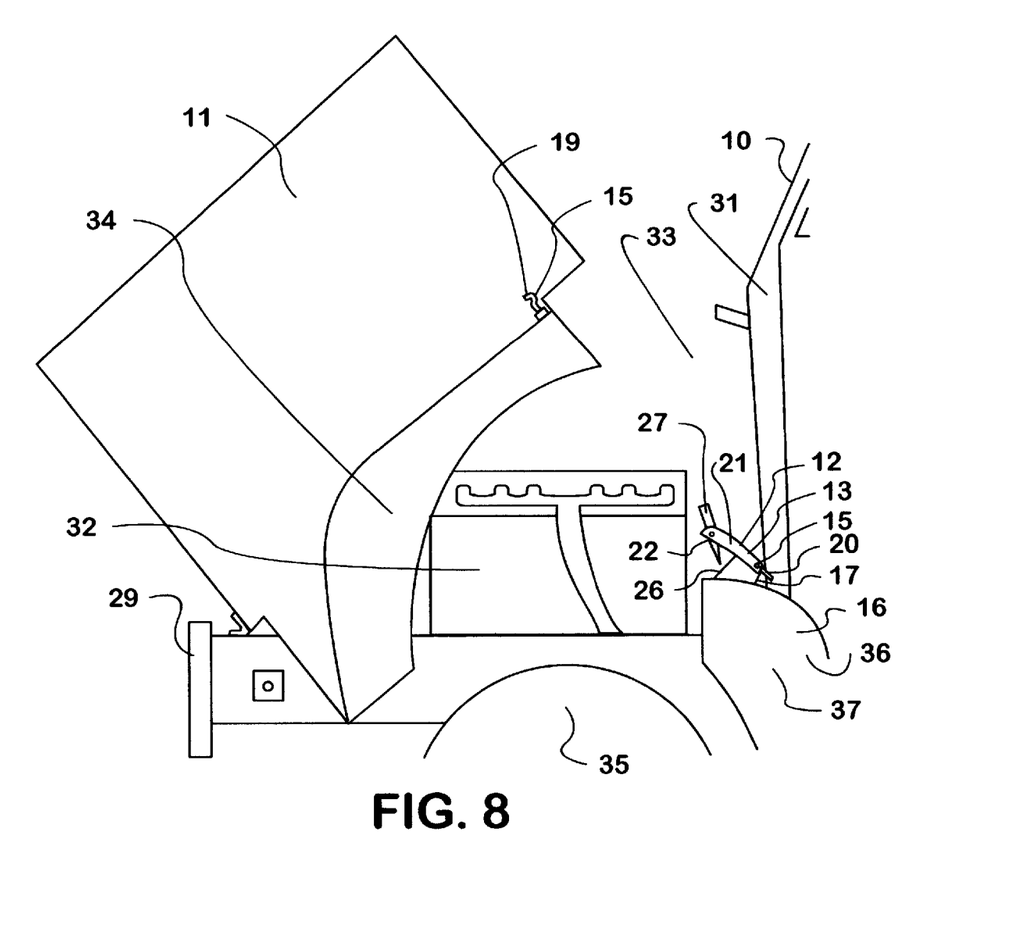
FIG. 8 is a side view showing a front portion of a vehicle with a hood latch according to the present invention, which hood latch has the anchor end thereof mounted to the latch-anchor component, with the engine compartment hood of the vehicle in an open position.
Figure 9:
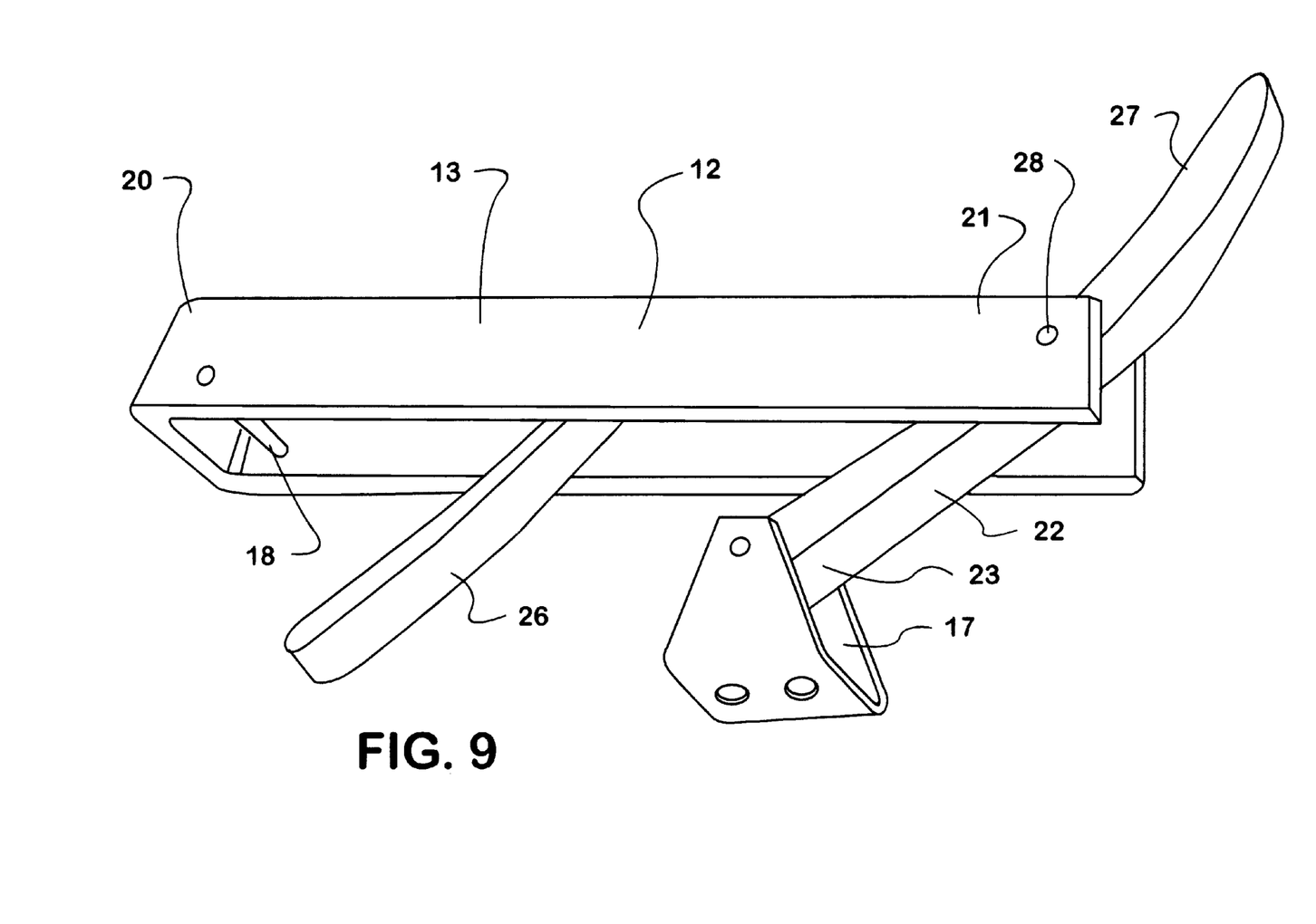
FIG. 9 is a perspective view of a hood latch according to the present invention.
Figure 10:
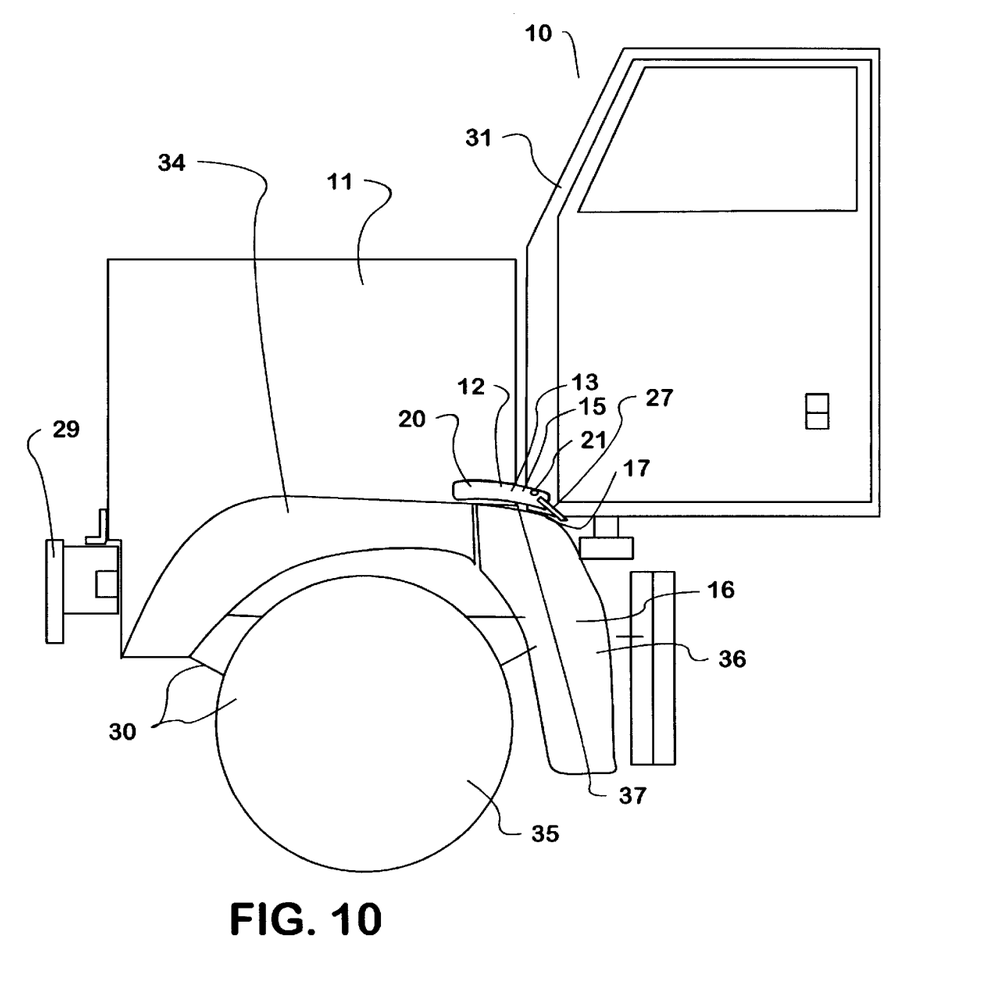
FIG. 10 is a side view showing a front portion of a vehicle with a hood latch according to the present invention with the engine compartment hood of the vehicle in a closed position and the visible hood latch secured in a latched state.

As was alluded to above, according to the present invention the latching structure 18 and the latch-mounting structure 17 of a hood latch 12 according to the present invention may be engaged to either of the ends of the tension body 13 of the hood latch 12. The latch-mounting structure 17 may be engaged to the draft end 21 of the tension body 13, in which case the latching structure 18 would be engaged to the anchor end 20 of the tension body 13. Hood latches 12 configured in such a manner according to the present invention are illustrated in FIGS. 1, 2, 3, 4, 5, 7, and 10. Alternatively, the latch-mounting structure 17 may be engaged to the anchor end 20 of the tension body 13, in which case the latching structure 18 would be engaged to the draft end 21 of the tension body 13. Hood latches 12 configured in such a manner according to the present invention are illustrated in FIG. 8. Whichever of the latch-mounting structure 17 and the latching structure 18 is engaged to the draft end 21 of the tension body 13 is engaged indirectly to the draft end 21 of the tension body 13 through the draft lever 22. In the case of the latch-mounting structure 17 being engaged to the draft end 21, the latch-mounting structure 17 is pivotally engaged to the pivot end 23 of the draft lever 22, as is shown in FIGS. 1, 2, 3, 4, 5, 7, 9, and 10. In the case of the latching structure 18 of the hood latch 12 being engaged to the draft end 21 of the draft lever 22, the latching structure 18 is engaged to and/or is an integral part of the pivot end 23 of the draft lever 22. Whichever of the latching structure 18 and the latch-mounting structure 17 is engaged to the anchor end 20 of the tension body 13 may be directly or indirectly engaged to the anchor end 20 in any of a number of different ways that are well known and/or easily imaginable by one of ordinary skill in the art. In the preferred embodiment the latch-mounting structure 17 is mounted to the latch-anchor component 16, and the pivot end 23 of the draft lever 22 is pivotally engaged to the latch-mounting structure 17. Also in the preferred embodiment, the anchor end 20 of the tension body 13 has the latching structure 18 of the hood latch 12 engaged to it and the complimentary base latching-structure 19, to which the latching structure 18 engaged to the anchor end 20 of the tension body 13 may be releasably latched, is mounted to the engine-compartment hood 11.

A draft lever 22 of a hood latch 12 in accordance with the present invention may be constructed and engaged to the tension body 13 of the hood latch 12 in any of a number of different ways. In the preferred embodiment of the invention the draft lever 22 of each of the hood latches 12 is pivotally engaged to the draft end 21 of the tension body 13 by a pin 28 that extends through the draft lever 22 and the draft end 21 of the tension body 13. Additionally, in the preferred embodiment the draft lever 22 comprises a draft handle 27 that extends from the portion of the draft lever 22 that is pivotally engaged to the draft end 21 of the tension body 13, The draft handle 27 is distinct from and extends in a different direction than the portion of the draft lever 22 that extends to the pivot end 23 of the draft lever 22. The draft handle 27 extends beyond the draft end 21 of the tension body 13. Manipulating the draft handle 27 of the hood latch 12 is the easiest way for an individual to rotate the draft lever 22 about its pivot end 23 when securing the hood latch 12 in a latched position.

A vehicle 10 according to the present invention may be of any of a number of different designs. A vehicle 10 according to the present invention has one or more frame structures 29 to which a majority of other components of the vehicle 10 are engaged directly or indirectly and from which a majority of other components of the vehicle 10 derive support directly or indirectly. A vehicle 10 according to the present invention further comprises a suspension system 30 to which the one or more frame structures 29 of the vehicle 10 are engaged and by which the one or more frame structures 29 of the vehicle 10 are supported above the ground. The suspension system 30 of the vehicle 10 is constructed in such a manner to support the one or more frame structures 29 of the vehicle 10 above the ground as was mentioned above and, thus, to indirectly support the components of the vehicle 10 other than the suspension system 30 and the one or more frame structures 29 above the ground. The suspension system 30 is also constructed to provide the vehicle 10 with a relatively low resistance to movement along the ground. A vehicle 10 according to the present invention further comprises an occupant cabin 31 within which an operator of the vehicle 10 may reside while operating the vehicle 10. The occupant cabin 31 of the vehicle 10 is engaged to and supported by one or more of the one or more frame structures 29 of the vehicle 10. A vehicle 10 according to the present invention further comprises an engine 32 for providing motivating power for the vehicle 10. The engine 32 of the vehicle is engaged to and supported by one or more of the one or more frame structures 29 of the vehicle 10 and is disposed within an engine compartment 33 of the vehicle 10. As mentioned above, a vehicle 10 according to the present invention further comprises an engine-compartment hood 11 which is moveable between a closed position in which it substantially covers an engine compartment 33 of the vehicle 10 and one or more open positions in which it leaves the engine compartment 33 of the vehicle 10 exposed so that an individual may access the engine 32 of the vehicle 10. When the engine-compartment hood 11 is in a closed position it is engaged directly and/or indirectly to and derives support directly and/or indirectly from said one or more frame structures 29 of said vehicle 10. An engine-compartment hood 11 or a portion thereof that derives support indirectly from a frame structure 29 of the vehicle 10 derives support from a component other than the frame structure 29 which component derives support directly or indirectly from the frame structure 29. For example a portion of the engine-compartment hood 11 may derive support from the occupant cabin 31, which in turn, derives support from one or more frame structures 29 of the vehicle 10. Some vehicles 10 in accordance with the present invention may comprise engine-compartment hoods 11 that can be removed from the vehicle 10 entirely as the open position of the engine-compartment hood 11, in which case the engine-compartment hood 11 would only be supported directly and/or indirectly by the frame structures 29 of the vehicle 10 when the engine-compartment hood 11 were closed.

As was mentioned above, in the preferred embodiment the engine-compartment hood 11 of a vehicle 10 according to the present invention is pivotally engaged to the vehicle 10 at a point in front of the engine compartment 33 of the vehicle 10. In the preferred embodiment a forward lower portion of the engine-compartment hood 11 is pivotally engaged to a frame structure 29 of the vehicle 10. According to this embodiment the engine-compartment hood 11 is pivoted upward and forward about its point of pivotal engagement to the frame structure 29 in order to open the engine-compartment hood 11 and subsequently the engine-compartment hood 11 is pivoted rearwardly and downwardly in order to close the engine-compartment hood 11. Also in the preferred embodiment the engine-compartment hood 11 comprises fenders 34 which radially surround front wheels 35 of the vehicle 10 to the top side and the front side of the front wheels 35. Also in the preferred embodiment the vehicle 10 comprises fender extensions 36 that are mounted to the occupant cabin 31 and/or one or more of the frame structures 29 of the vehicle 10. The fender extensions 36 radially surround a rear portion of the front wheels 35 of the vehicle 10 and have a forward edges adjacent which rear edges of the fenders 34 of the engine-compartment hood 11 are disposed when the engine-compartment hood 11 is closed. In the preferred embodiment the latch-anchor components 16 of the vehicle 10 are the fender extensions 36. In this embodiment a hood latch 12 according to the present invention is mounted to an upper forward portion of the fender extensions 36 of the vehicle 10. The vehicle 10 of the preferred embodiment of the present invention includes a fender extension 36 disposed upon each lateral side of the vehicle 10 as can best be seen in FIG. 3. The vehicle 10 of the preferred embodiment further has a hood latch 12 of the present invention mounted to each of the fender extensions 36 disposed upon opposite sides of the vehicle 10. Use of hood latches 12 according to the present invention with prop legs 26 for supporting the hood latches out of the path of travel of the engine-compartment hood 11 is particularly beneficial for such a vehicle 10. This is true because such a vehicle 10, with hood latches 12 disposed upon laterally opposite sides thereof makes it difficult or impossible for an individual to hold both hood latches 12 out of the path of the engine-compartment hood 11 when closing it. In this embodiment the base latching-structure 19 to which the latching structure 18 of the hood latches 12 may be releasably latched is mounted to rear portions of the fenders 34 of the engine-compartment hood 11. In the preferred embodiment, when the engine-compartment hood 11 is closed, the hood latches 12 may, thus be latched and secured so that they apply hood-retention forces rearwardly and/or downwardly to the fenders 34 of the engine-compartment hood 11, thus preventing upward and forward pivoting of the engine-compartment hood 11 toward its open position.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

We claim:

1. A vehicle, comprising:
   (a) one or more frame structures to which other components of said vehicle are directly or indirectly engaged and from which other components of said vehicle derive support directly or indirectly;
   (b) a suspension system to which said one or more frame structures of said vehicle are engaged and by which said one or more frame structures of said vehicle are supported above ground and which suspension system provides said vehicle with low resistance to movement along the ground;
   (c) an occupant cabin that is engaged to and supported by one or more of said one or more frame structures of said vehicle;
   (d) an engine that is mounted to one or more of said frame structures of said vehicle, that is disposed in an engine compartment of said vehicle, and that is operable to provide motivating power for said vehicle;
   (e) an engine-compartment hood that is moveable between a closed position in which said engine-compartment hood substantially covers said engine compartment and one or more open positions in which said engine-compartment hood exposes said engine compartment and which is engaged directly and/or indirectly to and derives support directly and/or indirectly from said frame structures of said vehicle at least when said engine compartment hood is in said closed position;
   (f) a hood-latching system that comprises one or more hood latches for retaining said engine-compartment hood in said closed position when desired;
   (g) wherein each of said hood latches of said hood-latching system comprises a tension body constructed of elastomer material;
   (h) wherein each of said hood latches of said hood-latching system further comprises a draft lever engaged to a draft end of said tension body;
   (i) wherein each of said draft lever of said one or more hood latches comprises a pivot end thereof at some distance from a point of said engagement of said draft end of said tension body to said draft lever;
   (j) wherein each of said hood latches comprises latch-mounting structure;
   (k) wherein each of said hood latches comprises latching structure;
   (l) wherein either said latch-mounting structure or said latching structure of each of said hood latches is engaged to and/or defined by said pivot end of said draft lever;
   (m) wherein whichever of said latch-mounting structure and said latching structure of each of said hood latches is not engaged to and/or defined by said pivot end of said draft lever is engaged directly or indirectly to an anchor end of said tension body which is disposed at some distance from said draft end of said tension body;
   (n) wherein said latch-mounting structure of each of said hood latches is mounted to one or more latch-anchor components of said vehicle in such a position that, when said hood latches are secured in a latched state or are allowed to rest in a same general orientation as that which they have when they are in a latched state, said tension body of each of said hood latches is disposed at least partially above a non-vertical surface of said latch-anchor component to which said respective latch-mounting structure is mounted;
   (o) wherein said latch-anchor components to which said latch-mounting structure of said hood latches are mounted are engaged directly and/or indirectly to and derive support directly and/or indirectly from said frame structures of said vehicle;
   (p) wherein base latching structure(s), to which said latching structure(s) of each of said hood latches can be releasably latched, are mounted to said engine compartment hood;
   (q) wherein each of said hood latches further comprises a prop leg that is engaged to said tension body at a point between said anchor end and said draft end and that extends from said tension body at an angle to a longitudinal axis of said tension body; and
   (r) each of said hood latches is positioned and oriented such that when they are secured in a latched state or are allowed to rest in a same general orientation as they would be in when secured in a latched state, said prop leg of each of said hood latches extends toward and presses against said non-vertical surface of said latch-anchor component.

2. The vehicle of claim 1, wherein:
   (a) said prop leg of each of said hood latches has a stiffness such that, when each of said hood latches is not latched, but is allowed to rest in a position and orientation generally such that said prop leg extends into contact with and presses against said non-vertical surface of said latch-anchor component, said prop leg supports said tension body in an elevated position above said non-vertical surface against which said prop leg presses, a force of ten pounds in a direction perpendicular to a longitudinal axis of said tension body being sufficient to deform said prop leg toward said tension body to an extent that said tension body may be driven into contact with said non-vertical surface so that said hood latch may be latched.

3. The vehicle of claim 2, wherein:
   (a) said latch-mounting structure of each of said hood latches is pivotally engaged to said pivot end of said draft lever; and
   (b) said latching structure of each of said hood latches is engaged to said anchor end of said tension body.

4. The vehicle of claim 3, wherein:
   (a) said draft lever of each of said hood latches is pivotally engaged to said draft end of said tension body.

5. The vehicle of claim 4, wherein:
   (a) said draft lever of each of said hood latches further comprises a draft handle that extends from said portion of said draft lever that is pivotally engaged to said draft end of said tension body; and (b) said draft handle of each of said hood latches is distinct from and extends in a different direction than a portion of said draft lever that extends from said portion that is pivotally engaged to said draft end of said tension body to said pivot end of said draft lever.

6. The vehicle of claim 5, wherein:
(a) said draft handle of each of said hood latches extends outwardly from said draft end of said tension body.

7. The vehicle of claim 6, wherein:
(a) said engine compartment hood is pivotally engaged at a forward portion thereof to one or more of said frame structures of said vehicle; and
(b) each of said latch-mounting structures of said hood latches, and thereby said hood latches themselves, are mounted to latch-anchor components at a point adjacent which a rear portion of said engine-compartment hood is disposed when said engine-compartment hood is closed and said hood latches latchable to base-latching structure(s) that are attached to said rear portion of said engine compartment hood when it is closed to prevent upward and forward pivoting of said engine compartment hood toward its open position.

8. The vehicle of claim 7, wherein:
(a) said engine-compartment hood comprises fenders that radially surround a top side and a front side of front wheels of said vehicle;
(b) said vehicle further comprises two fender extensions that are mounted to said occupant cabin and/or said one or more frame structures of said vehicle on opposite lateral sides of said vehicle and that radially surround said front wheels to a rear side of said front wheels;
(c) wherein an upper forward edge of each of said fender extensions is positioned such that, when said engine-compartment hood is closed, a rear portion of said fenders of said engine compartment hood is disposed adjacent said upper forward portion of said fender extensions; and
(d) said latch-mounting structure of one of said hood latches and thereby one of said hood latches itself, is mounted to said upper forward portion of each of said fender extensions in such a position that when said engine-compartment hood is closed each of said hood latches mounted to said fender extensions engageable to a base latching-structure that is mounted to a rear portion of said fenders of said engine-compartment hood and secured in a latched state to apply hood retention forces downwardly and/or rearwardly to said engine-compartment hood to prevent upward and forward rotation of said engine-compartment hood toward its open position.

9. The vehicle of claim 3, wherein:
(a) said draft lever of each of said hood latches further comprises a draft handle that extends from said pardon of said draft lever that is pivotally engaged to said draft end of said tension body; and
(b) said draft handle of each of said hood latches is distinct from and extends in a different direction than a portion of said draft lever that extends from said portion that is pivotally engaged to said draft end of said tension body to said pivot end of said draft lever.

10. The vehicle of claim 9, wherein:
(a) said draft handle of each of said hood latches extends outwardly from said draft end of said tension body.

11. The vehicle of claim 10, wherein:
(a) said engine compartment hood is pivotally engaged at a forward portion thereof to one or more of said frame structures of said vehicle; and
(b) each of said latch-mounting structures of said hood latches, and thereby said hood latches themselves, are mounted to latch-anchor components at a point adjacent which a mar portion of said engine-compartment hood is disposed when said engine-compartment hood is closed and said hood latches latchable to base-latching structure(s) that are attached to said rear portion of said engine compartment hood when it is closed to prevent upward and forward pivoting of said engine compartment hood toward its open position.

12. The vehicle of claim 11, wherein:
(a) said engine-compartment hood comprises fenders that radially surround a top side and a front side of front wheels of said vehicle;
(b) said vehicle further comprises two fender extensions that are mounted to said occupant cabin and/or said one or more frame structures of said vehicle on opposite lateral sides of said vehicle and that radially surround said front wheels to a rear side of said front wheels;
(c) wherein an upper forward edge of each of said fender extensions is positioned such that, when said engine-compartment hood is closed, a rear portion of said fenders of said engine compartment hood is disposed adjacent said upper forward portion of said fender extensions; and
(d) said latch-mounting structure of one of said hood latches and thereby one of said hood latches itself, is mounted to said upper forward portion of each of said fender extensions in such a position that when said engine-compartment hood is closed each of said hood latches mounted to said fender extensions engageable to a base latching-structure that is mounted to a rear portion of said fenders of said engine-compartment hood and secured in a latched state to apply hood retention forces downwardly anti/or rearwardly to said engine-compartment hood to prevent upward and forward rotation of said engine-compartment hood toward its open position.

13. A hood latch, comprising:
(a) a tension body constructed of elastomer material;
(b) a draft lever engaged to a draft end of said tension body;
(c) wherein said draft lever comprises a pivot end thereof at some distance from a point of said engagement of said draft end of said tension body to said draft lever;
(d) latch-mounting structure;
(e) latching structure;
(f) wherein either said latch-mounting structure or said latching structure is engaged to and/or defined by said pivot end of said draft lever;
(g) wherein whichever of said latch-mounting structure and said latching structure is not engaged to and/or defined by said pivot end of said draft lever is engaged directly or indirectly to an anchor end of said tension body which is disposed at same distance from said draft end of said tension body; and
(h) a prop leg that is engaged to said tension body at a point between said anchor end and said draft end and that extends from said tension body at an angle to a longitudinal axis of said tension body.

14. The hood latch of claim 13, wherein:
(a) said prop leg is of such a stiffness that it is capable of supporting said tension body in an elevated position above a surface against which said prop leg is abutted, with a force of ten pounds being sufficient to deform said prop leg into contact with said tension body.

15. The hood latch of claim 14, wherein:
(a) said latch-mounting structure is pivotally engaged to said pivot end of said draft lever; and
(b) said latching structure is engaged to said anchor end of said tension body.

16. The hood latch of claim 15, wherein:
(a) said draft lever is pivotally engaged to said draft end of said tension body.

17. The hood latch of claim 16, wherein:
(a) said draft lever further comprises a draft handle that extends from said portion of said draft lever that is pivotally engaged to said draft end of said tension body; and
(b) said draft handle is distinct from and extends in a different direction than a portion of said draft lever which extends from said portion that is pivotally engaged to said draft end of said tension body to said pivot end of said draft lever.

18. The hood latch of claim 17, wherein:
(a) said draft handle extends outwardly from said draft end of said tension body.

19. The hood latch of claim 15, wherein:
(a) said draft lever further comprises a draft handle that extends from said portion of said draft lever that is engaged to said draft end of said tension body; and
(b) said draft handle is distinct from and extends in a different direction than a portion of said draft lever that extends from said portion that is engaged to said draft end of said tension body to said pivot end of said draft lever.

20. The hood latch of claim 19, wherein:
(a) said draft handle extends outwardly from said draft end of said tension body.

* * * * *